US010020081B2

(12) United States Patent
Carvajal et al.

(10) Patent No.: US 10,020,081 B2
(45) Date of Patent: Jul. 10, 2018

(54) NUCLEAR CONTROL ROD POSITION INDICATION SYSTEM

(71) Applicant: Westinghouse Electric Company LLC, Cranberry Township, PA (US)

(72) Inventors: Jorge V. Carvajal, Irwin, PA (US); Michael D. Heibel, Harrison City, PA (US); Nicola G. Arlia, Pittsburgh, PA (US); Robert W. Flammang, Pittsburgh, PA (US); David M. Sumego, Cranberry Township, PA (US); Michael A. James, Harmony, PA (US); Melissa M. Walter, Butler, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 592 days.

(21) Appl. No.: 14/996,439

(22) Filed: Jan. 15, 2016

(65) Prior Publication Data

US 2017/0206990 A1 Jul. 20, 2017

(51) Int. Cl.
*G21C 17/12* (2006.01)
*G01S 15/88* (2006.01)

(52) U.S. Cl.
CPC .............. *G21C 17/12* (2013.01); *G01S 15/88* (2013.01)

(58) Field of Classification Search
CPC ........ G21C 17/00; G21C 17/10; G21C 17/12; G01S 15/08; G01S 15/10; G01S 15/88;
(Continued)

(56) References Cited

U.S. PATENT DOCUMENTS

| 5,229,066 A | 7/1993 | Impink, Jr. et al. |
| 5,276,719 A | 1/1994 | Batheja et al. |

(Continued)

FOREIGN PATENT DOCUMENTS

| JP | 2728834 B2 | 3/1998 |
| JP | 2000-028781 A | 1/2000 |
| WO | 2004044611 A2 | 5/2004 |

OTHER PUBLICATIONS

APC International, Ltd: American Piezo website. "What's a Transducer?" article. Available online since at least 2012 per archive.org. <https://web.archive.org/web/20120120003618/https://www.americanpiezo.com/piezo-theory/whats-a-transducer.html>. (Year: 2012).*

(Continued)

*Primary Examiner* — Jack W Keith
*Assistant Examiner* — Lily C Garner
(74) *Attorney, Agent, or Firm* — Joseph C. Spadacene; Westinghouse Electric Company LLC

(57) ABSTRACT

A pulsed sonar-based wireless rod position indication system that utilizes nuclear radiation and high temperature tolerant hardware. The pulsed sonar-based rod position indication system can precisely locate the rod position by measuring the time of flight of a transmitted signal and by using the phase and amplitude information of the same transmitted signal. Primary and secondary antenna probes located in the interior of the control rod drive rod travel housing and full hardware redundancy provide for improved accuracy. The time of flight, phase and amplitude raw signals are inputted to a wireless data transmitter capable of sending the raw signals to a receiver antenna located elsewhere inside a containment for further processing.

19 Claims, 3 Drawing Sheets

(58) Field of Classification Search
CPC ...... G01S 15/14; G01S 15/36; G01S 15/8945; G01S 15/8952; G01S 7/4865; G01S 7/52006; G01S 7/292; G01S 7/354
See application file for complete search history.

(56) References Cited

U.S. PATENT DOCUMENTS

| | | | |
|---|---|---|---|
| 7,005,783 B2 | 2/2006 | Hwu et al. | |
| 7,679,996 B2 * | 3/2010 | Gross | G01S 15/08 367/99 |
| 8,767,903 B2 * | 7/2014 | Seidel | G21C 17/10 340/870.01 |
| 8,824,617 B2 | 9/2014 | Sexton et al. | |
| 2014/0321593 A1 | 10/2014 | Morton et al. | |

OTHER PUBLICATIONS

N. Bilaniuk and G.S.K. Wong (1993), "Speed of sound in pure water as a function of temperature," J. Acoust. Soc. Am. 93(3) pp. 1609-1612, as amended by N. Bilaniuk and G. S.. K. Wong (1996), Erratum: Speed of sound in pure water as a function of temperature [J. Acoust. Soc. Am. 93, 1609-1612 (1993)], J. Acoust. Soc. Am. 99(5), p. 3257.
International Search Report and Written Opinion for PCT/US2017/012782, Including Forms PCT/ISA/220, PCT/ISA/210, PCT/ISA/237.

* cited by examiner

NUCLEAR CONTROL ROD POSITION INDICATION SYSTEM

BACKGROUND

1. Field

This invention pertains generally to nuclear reactor control rod position indication systems and more particularly to such a system that uses pulse sonar to determine the position of a control rod.

2. Related Art

Control rod position indication systems derive the axial positions of the control rods by direct measurement of the drive rod positions. Currently, both analog control rod position indication systems and digital control rod position indication systems are used in pressurized water reactors. The conventional digital control rod position indication systems have been in service for over thirty years in nuclear power stations worldwide and are currently being used as the basis for the control rod position indication systems in the new Westinghouse AP1000® designs offered by Westinghouse Electric Company LLC, Cranberry Township, Pa.

A conventional pressurized water reactor control rod position indication system is illustrated in FIG. 1 and includes a reactor vessel 10 that houses a nuclear core 28 into which control rods 30 are inserted and withdrawn to control the nuclear reaction. The control rods 30 are typically connected together by a spider and driven into and out of the core by a drive rod that moves within a pressure housing 26 in steps activated by a control rod drive mechanism (CRDM). The position of the control rods 30 relative to the core 28 are determined by rod position indicators 12.

A conventional digital rod position indication system, such as the one schematically illustrated in FIG. 1, includes two coil stacks 12 for each control rod drive rod and the associated digital rod position indication electronics 14, 20 for processing the signals from the coil stacks. Each coil stack 12 is an independent channel of coils placed over the pressure housing 26. Each channel includes twenty-one coils. The coils are interleaved and positioned at 3.75 inch (9.53 cm.) intervals (six steps). The digital rod position indication electronics for each coil stack of each control rod drive rod are located in a pair of redundant data cabinets 14A and 14B. Although intended to provide independent verification of the control rod position, conventional digital rod position indication systems are not accurate to fewer than six steps. The overall accuracy of a digital rod position indication system is considered to be accurate within plus or minus 3.75 inches (9.53 cm.) (six steps) with both channels functioning and plus or minus 7.5 inches (19.1 cm.) using a single channel (twelve steps). In contrast to conventional digital rod position indication systems, a conventional analog rod position indication system determines the position based on the amplitude of the DC output voltage of an electrical coil stack linear variable differential transformer. The overall accuracy of a properly calibrated analog rod position indication system is considered to be accurate within plus or minus 7.2 inches (18.3) (twelve steps). Neither conventional analog rod position indication systems nor conventional digital rod position indication systems are capable of determining the actual positions of the control rods.

It should be noted that for purposes of this application, the phrase "control rod" is used generally to refer to a unit for which separate axial position information is maintained, such as a group of control rods physically connected in a cluster assembly. The number of control rods varies according to the plant design. For example, a typical four-loop pressurized water reactor has fifty-three control rods. Each control rod requires its own set of coils having one or more channels and the digital rod position indication electronics associated with each channel in the case of digital systems. Thus, in a typical four-loop pressurized water reactor, the entire digital rod position indication system would include fifty-three coil stacks, each having two independent channels, and 106 digital rod position indication electronics units.

Existing control rod position indication systems use hardwired connections from the rod position detectors 12 to the rod position indication electronics cabinets 14 and from the rod position indication electronics cabinets 14 to a display cabinet 20. The analog rod position indication system employs rod position indication electronics cabinets located outside the containment 18, while the digital rod position indication system employs rod position indication electronics cabinets located inside the containment 18. During outages, fuel rods are replaced by removing the reactor vessel head. To remove the head, all rod position indicator detectors 12 must be disconnected. This can take several days depending on whether an integrated head package exists. Even in cases where an integrated head is used, the process can still take up to one full day. All cables are disconnected and manipulated, causing stress and wear on the cable assemblies. This may lead to connection issues and, ultimately, can adversely affect rod position measurement.

Currently, digital rod position indication is accomplished by detectors (69 total detector assemblies for an AP1000® plant) mounted outside and concentric with the rod travel housing 26 located above the reactor vessel head. These detectors consist of coiled wire slipped over a tube and spaced along its length at 3.75 inch (9.53 cm.) intervals. The tube fits over the drive rod travel housing. As the rod moves through the coil, the magnetic flux from the coils change. This magnetic flux change is processed by signal processing hardware to produce a measurement and reporting of rod position.

Each detector assembly requires a tube which is positioned over the rod travel housing. Also, each of the 48 detector coils per detector assembly requires several cable assemblies in order to supply the AC current needed to generate the electromagnetic field. They also need two cabinets for signal processing. Lastly, the resolution of the detectors is only plus or minus 3.125 inches (7.938 cm.) limited by the magnetic field interaction between the coils. This limitation precludes the system from achieving single-step (⅝ inch (1.59 cm.)) accuracy. Instead, the system is limited to providing positional information in groups of five steps, therefore adding un-necessary conservatism to plant safety margins.

Accordingly, a new control rod position indication system is desired that can provide greater accuracy and efficiency during refueling outages.

SUMMARY

These and other objects are achieved in a nuclear reactor system having a reactor vessel that houses a nuclear core in which fissile reactions take place within a pressure boundary of the reactor vessel and a control rod system for controlling the fissile reactions. The control rod system comprises a control rod configured to move within a sonically conductive coolant, into and out of the nuclear core, to control the fissile reactions. A drive system is configured to drive the control rod into and out of the core. A control rod position monitoring system is also provided comprising a sonar pulse generator configured to generate a series of sonar pulses. An antenna is fixedly positioned within the pressure boundary, above an upper limit of travel of the control rod and is configured to receive the sonar pulses generated by the sonar pulse generator and transmit these sonar pulses to the upper portion of the control rod and receive a reflected sonar signal from the control rod and communicate the reflected sonar signal to a selected location a spaced distance from the antenna outside of the pressure boundary. A receiver is positioned at the spaced distance from the antenna and is configured to receive the reflected sonar signal and communicate the reflected sonar signal to a processing unit that is configured to analyze the reflected sonar signal to determine a control rod position.

In one embodiment, the sonar pulse generator is supported outside of the coolant and transmits the series of sonar pulses wirelessly to the antenna and the antenna transmits the reflected sonar signal wirelessly to the receiver. Preferably, the sonar signal is an ultrasonic signal and the sonar pulse generator is a vacuum micro-electronic device. Desirably, the sonar pulse generator and the receiver are a vacuum micro-electronic device transceiver. Conventionally, the control rod comprises a plurality of separately movable control rods with each of the separately movable control rods having a corresponding control rod position monitoring system, wherein in accordance with one embodiment of this invention the sonar pulses for each of the separately movable control rod position monitoring systems has its own unique frequency. Preferably, the respective frequencies of the sonar pulses are different than any other frequency of electromagnetic noise within the nuclear reactor system.

In still another embodiment, the control rod position monitoring system comprises redundant control rod position monitoring systems including two distinct sonar pulse generators that are independent of each other and two distinct receivers that are independent of each other. Such a system may also include two distinct, separate antennas. In one such embodiment, the sonar pulses emitted from the two distinct sonar pulse generators are substantially emitted at the same frequency. In another such case, the sonar pulses emitted from the two distinct sonar pulse generators are emitted at separate distinct frequencies. Preferably, the antenna is a ceramic antenna.

In still another embodiment, the control rod includes a control rod drive rod and a control rod drive rod housing surrounds an upper portion of a travel path of the control rod drive rod with the antenna supported within an interior of the control rod drive rod housing. Preferably, the power required to energize the sonar pulse generator and the receiver is supplied by a thermoelectric generator with a hot junction attached to the control rod drive rod housing and a cold junction located opposite the hot junction, away from the control rod drive rod housing.

The system may also include a data transmitter that receives an original sonar pulse from the series of sonar pulses and a corresponding one of a reflected sonar signal, including amplitude and phase, and sends the original sonar pulse and reflected sonar signal to a signal processing base station for computation. Preferably, the data transmitter is a wireless data transmitter. The system may also include a temperature sensor for monitoring a temperature within the control rod drive rod housing and operable to communicate the temperature to the data transmitter which is operable to transmit the temperature to the signal processing base station. Desirably, the temperature sensor includes a plurality of temperature sensors spaced along the control rod drive rod housing. The signal processing base station is configured to determine the time of flight of the original sonar pulse and the reflected sonar signal and compensate the determination with the temperature.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
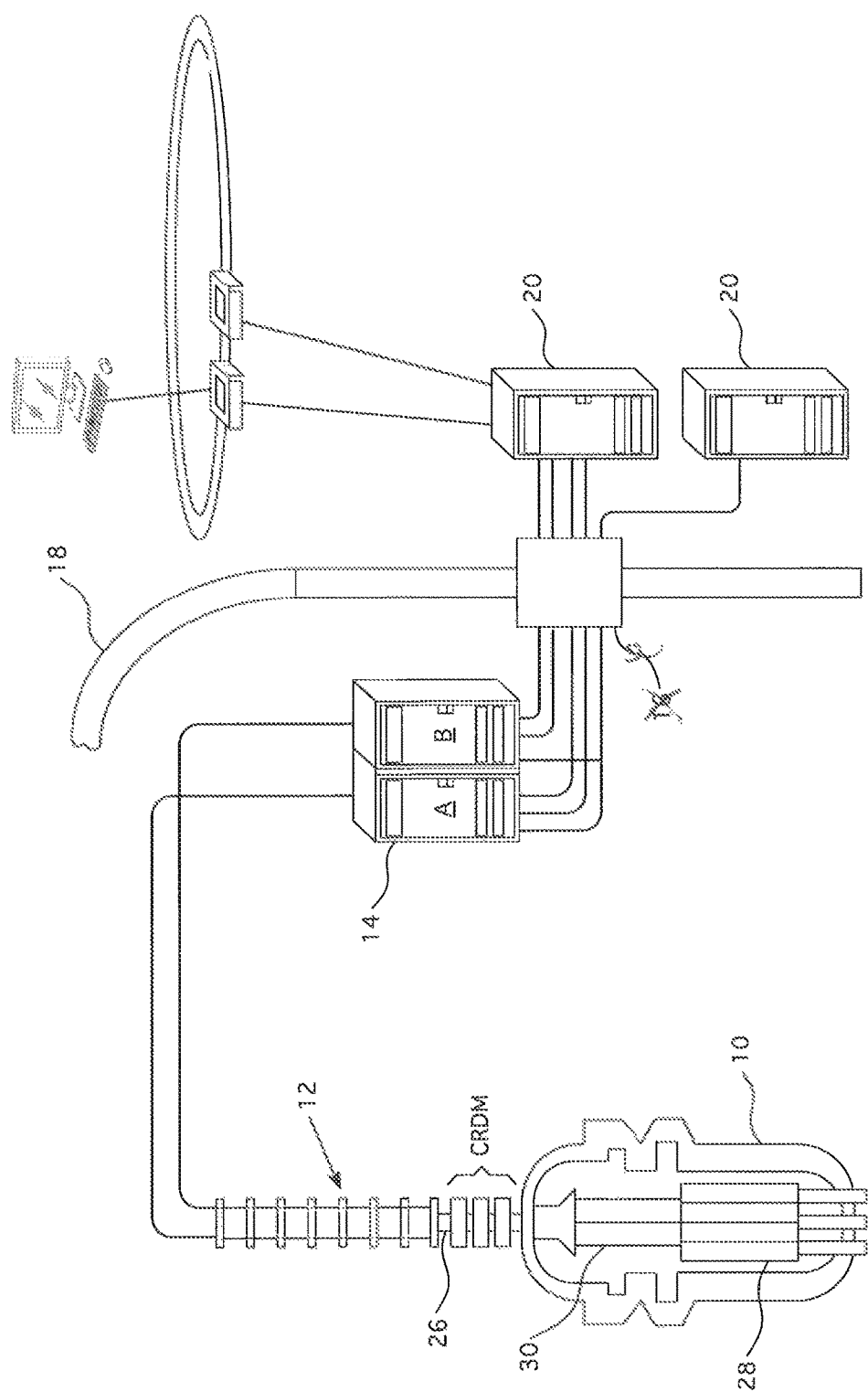
FIG. 1 is a schematic diagram of a conventional digital rod position indication system.
Figure 2:
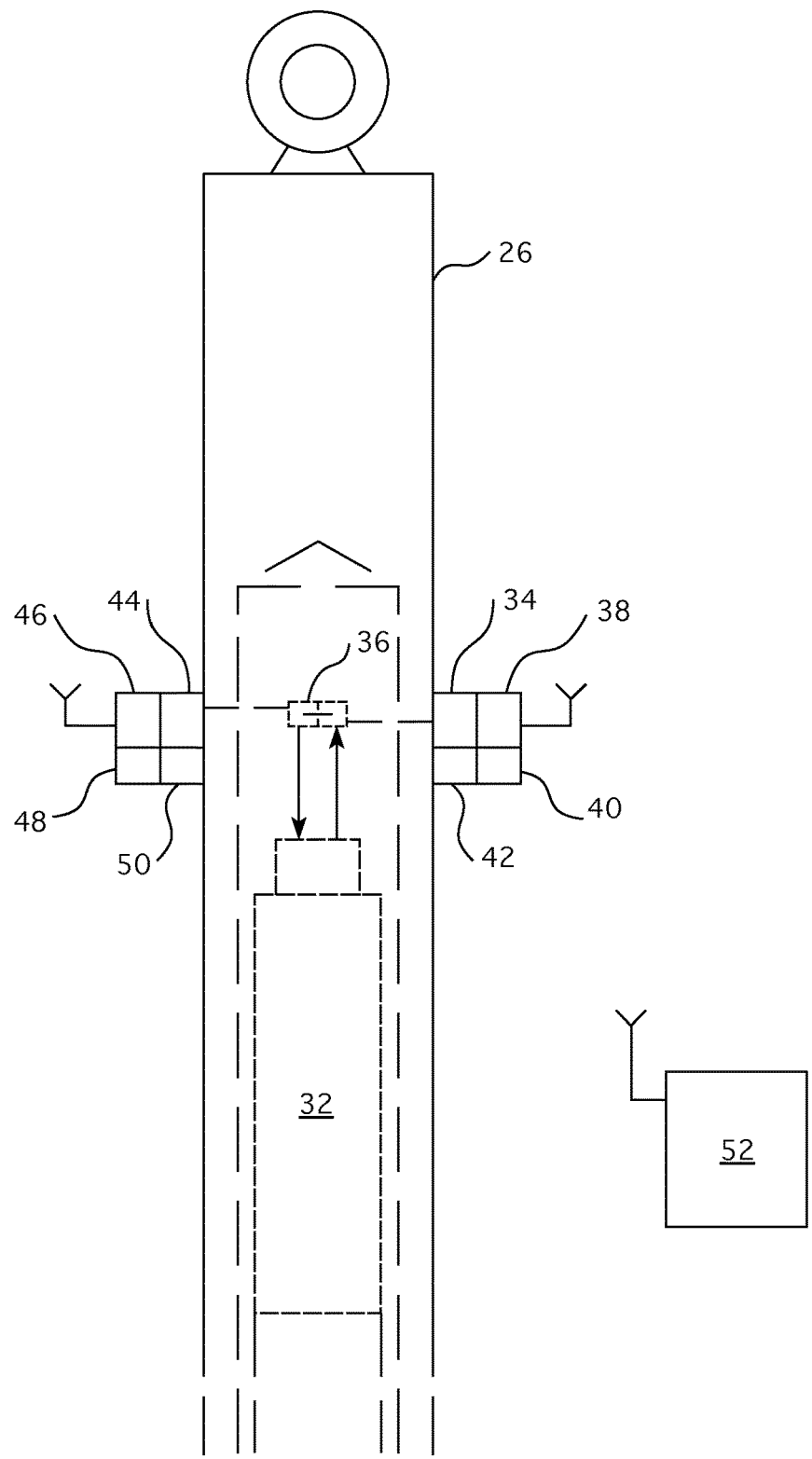
FIG. 2 is a schematic system layout of a preferred embodiment of this invention.

The preferred embodiment of this invention is illustrated in FIG. 2. The invention employs vacuum micro-electronic device pulse sonar transceivers 34 and 44 (transmitter/receiver), which are radiation hardened and temperature tolerant in order to perform rod position indication with significantly better accuracy than the current system. Vacuum micro-electronic devices such as commercially available SSVDs supplied by Innosys Inc., Emeryville, Calif., are suitable for this purpose. A description of a vacuum micro-electronic device can be found in U.S. Pat. No. 7,005,783. The existing magnetic coils 12 are replaced by a primary and redundant ceramic-based miniature antenna 36 with a very narrow beam width of approximately two degrees Beam Spread, which are located and supported in the interior of each control rod drive rod housing 26. Each control rod drive rod housing 26 is equipped with a primary and redundant set of hardware, which wirelessly transmit the control rod position data with a unique frequency in order to avoid interference. The primary hardware is shown to the right of FIG. 2 and includes the primary pulse vacuum micro-electronic device transceiver 34. The primary vacuum micro-electronic device data transmitter 38 and a thermoelectric generator 40 whose hot junction is coupled to the control rod drive rod housing 26 by a heat pipe 42. The redundant hardware shown to the left of FIG. 2 includes the redundant pulse vacuum micro-electronic device transceiver 44, the redundant vacuum micro-electronic device data transmitter 46 and the thermoelectric generator 48 whose hot junction is coupled to the drive rod housing 26 through a heat pipe 50. Prior to the installation of the hardware, an electromagnetic interference site survey is performed in order to identify potential sources of noise or interference. The transmission frequency for the wireless data transfer is chosen such that the transmission frequency occupies an unused frequency band at the rod housing location. The received measured signal is also filtered as needed in order to minimize electrical interference and other related issues impacting the accuracy of the transmitted signal. The DC power required by the pulse sonar transceivers 34 and 44 and the wireless data transmitters 38 and 46 is generated by way of one or more of the thermoelectric generators 40 and 48 that have the hot junction connected to the drive rod travel housing 26 through heat pipes 42 and 50 and a cold junction of the thermoelectric device located on the opposite side of the thermoelectric generators. It should be noted that the transceivers 34 and 44 and the wireless data transmitters 38 and 46 can be powered by conventional existing cables if necessary. The data can also be transmitted through conventional field cables if necessary.

Figure 3:
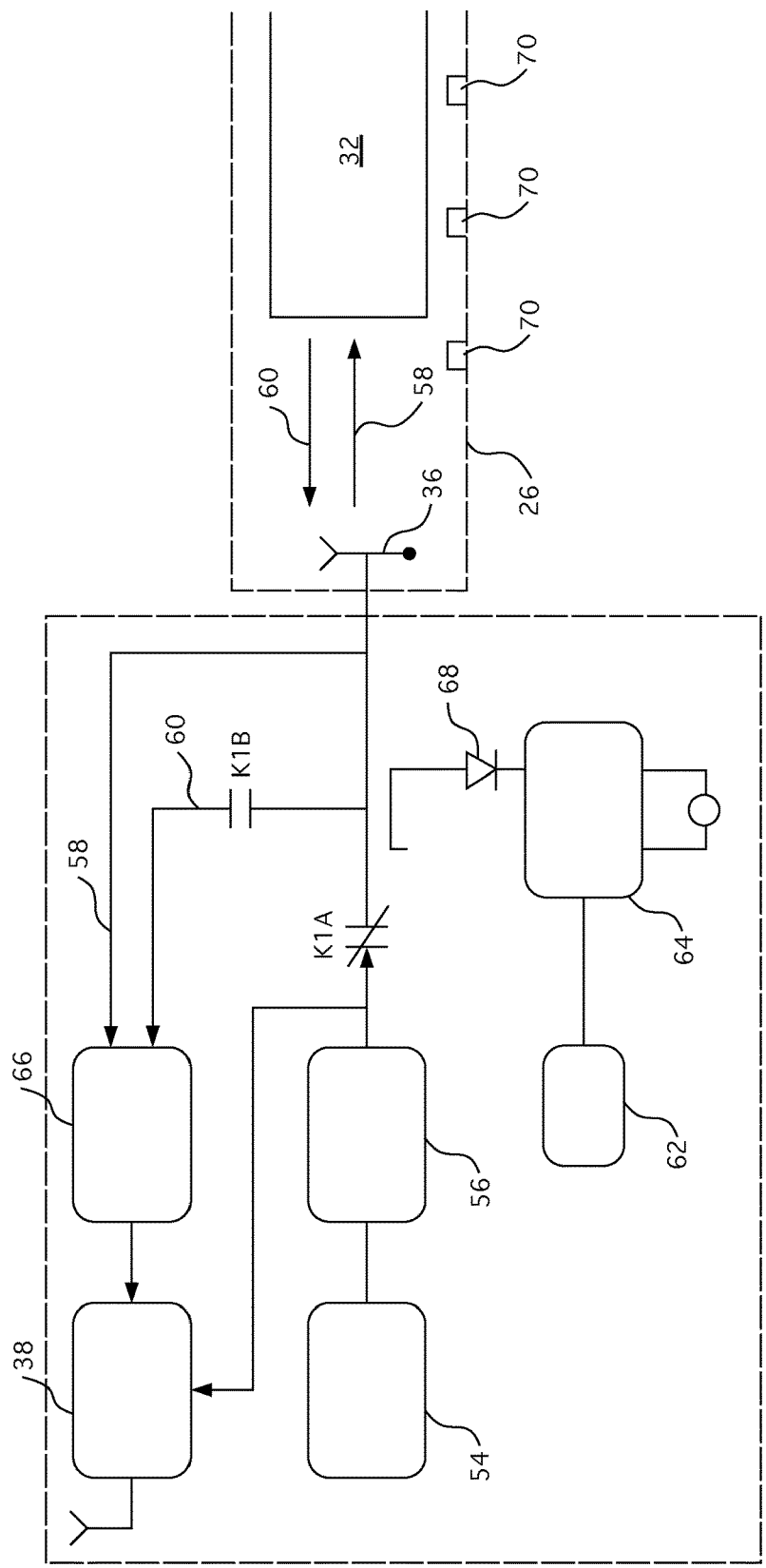
FIG. 3 is a system schematic block diagram of this invention.

FIG. 3 depicts a schematic of the system of this invention. This system employs a time of flight, phase difference and amplitude change methodology in order to determine the precise control rod position. Time of flight compilations are accomplished by measuring the time it takes for the signal to travel from the pulse transmitters 34 and 44 back to its source. The system, as illustrated in FIG. 3, comprises a pulse repetition frequency oscillator 54 which together with the pulse transmitter 56 makes up the pulse generator that transmits the pulses at predetermined and known times, which allow the echoes 60 reflected from the top of the control rod 32 to return to the antenna 36 and be transmitted to the base station 52 for signal processing. As the pulse transmitter 56 sends the signal 58 into the drive rod travel housing 26, the same signal is coupled and converted to a DC signal through a rectifying diode 68 and compared in the comparator 64 to a referenced voltage 62. The comparator output goes high when the transmitted signal is present, which energizes the relay coil K1, which opens the normally closed contact K1A and closes the normally open contact K1B. As the echo 60 is received, it cannot go into the pulse transmitter, because K1A is open; therefore, its only path is through K1B into the amplifier 66 and the wireless data transmitter 38. The phase and amplitude of the original signal are also known to the system by continuously splitting the pulse transmitter output and providing the frequency spectrum information to the wireless data transmitter. The wireless data transmitter sends the original raw signal (containing amplitude and phase) as well as the return signal once it bounces off the control rod, to a signal processing base station 52 for further computation. It should be noted that the time of flight measurements do not assume a constant speed of sound, because the speed in the coolant will be affected by the temperature, therefore, a series of thermocouples 70 are spaced along the control rod drive rod travel housing 26 as part of the system in order to adjust the speed of sound based upon the temperature. In order to achieve the accuracy required for this invention, the system will include multiple thermocouples submerged in the coolant within the control rod drive rod travel housing at different elevations along the axial dimension of the housing 26. As the rod moves, abrupt coolant temperature changes will be known by the system through these thermocouples and transmitted to the base station 52 to correct the signal for the temperature changes.

Typical pressurized water reactors operate at 2,220 psig (15.3 megapascal) and 626 degrees Fahrenheit (330° Celsius). According to the N. Bilaniuk and G. S. K. Wong model[1], the speed of sound in water is c=5,062 feet/second at 212 degrees Fahrenheit (100° Celsius). Using equation one, the round trip travel of the signal can be calculated:

$$t = \frac{2d}{c} \quad \text{Equation 1}$$

where d is the distance of the top of the control rod and c is the speed of sound in water at a specific temperature. Based on the above equation and assuming that the transreceiver antenna is located approximately one foot above the control rod drive rod when the rod is fully withdrawn, and that the total distance the rod can travel is sixteen feet, we can obtain the following round trip travel times:

$t(1\ \text{ft}) = 0.395$ mseconds $t(17\ \text{ft}) = 6.672$ mseconds

[1] N. Bilaniuk and G. S. K. Wong (1993), Speed of sound in pure water as a function of temperature, J. Acoust. Soc. Am. 93(3) pp 1609-1612, as amended by N. Bilaniuk and G. S. K. Wong (1996), Erratum: Speed of sound in pure water as a function of temperature [J. Acoust. Soc. Am. 93, 1609-1612 (1993)], J. Acoust. Soc. Am. 99(5), p 3257

If the control rod drive rod moves one step (⅝ inches (1.59 cm.)) from the fully withdrawn position, the round trip time becomes $t = 414.86$ μseconds The delta in the received signal for a ⅝ inch (1.59 cm.) movement would be 19.75 μseconds. This case would be the most demanding in the time of flight calculations and can be easily resolved with a 1 MHz clock in the processing base station. As stated above, the phase of the received signal and the amplitude information will also be used to determine the rod position. Phase and amplitude also change proportional to rod movement and are used as error correction terms. The estimated accuracy of this system is plus or minus 0.4 inch, which is over seven times better than the current system.

Accordingly, this system provides improved accuracy, which would be mainly limited by the control rod drive mechanism step accuracy; with the conservatism built into the current safety margin essentially eliminated by the better accuracy. The accuracy of the current prior art system is +/−3.125". The accuracy of the system of this invention is only limited by the smallest rod movement which is 0.625". The improved safety margins provided by this invention ultimately means that the reactors employing this concept can generate more electricity than their counterparts employing conventional technology. Redundant sensors provide the same accuracy instead of a half accuracy as with the current design. Only initial installation calibration is needed and sensor interaction issues within the rod travel housing and with adjacent rod housings are eliminated. Furthermore, the system enables elimination of the signal and powering cables which facilitates a more efficient fuel reload outage. Furthermore, the control rod position monitoring system of this invention provides substantially improved accuracy over current systems. Additionally, the drive rods no longer have to be ferromagnetic.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor system having a reactor vessel that houses a nuclear core in which fissile reactions take place within a pressure boundary of the reactor vessel and a control rod system for controlling the fissile reactions, the control rod system comprising:

a control rod configured to move, within a sonically conductive coolant, into and out of the nuclear core, to control the fissile reactions;

a drive system for driving the control rod into and out of the core; and a control rod position monitoring system comprising:
a sonar pulse generator configured to generate a series of sonar pulses;
an antenna fixedly positioned within the pressure boundary, above an upper limit of travel of the control rod and configured to receive the sonar pulses generated by the sonar pulse generator and transmit the sonar pulses to the upper portion of the control rod and receive a reflected sonar signal from the control rod and communicate the reflected sonar signal to a selected location a spaced distance from the antenna outside of the pressure boundary, wherein the control rod includes a control rod drive rod and a control rod drive rod housing surrounds an upper portion of a travel path of the control rod drive rod with the antenna supported within an interior of the control rod drive rod housing; and
a receiver positioned at the spaced distance from the antenna and configured to receive the reflected sonar signal and communicate the reflected sonar signal to a processing unit that is configured to analyze the reflected sonar signal to determine a control rod position.

2. The nuclear reactor system of claim 1 wherein the sonar pulse generator is supported outside of the coolant and transmits the series of sonar pulses wirelessly to the antenna.

3. The nuclear reactor system of claim 2 wherein the antenna transmits the reflected sonar signal wirelessly to the receiver.

4. The nuclear reactor system of claim 1 wherein the sonar signal is an ultrasonic signal.

5. The nuclear reactor system of claim 1 wherein the sonar pulse generator is a vacuum micro-electronic device.

6. The nuclear reactor system of claim 1 wherein the sonar pulse generator and the receiver are a vacuum micro-electronic device transceiver.

7. The nuclear reactor system of claim 1 wherein the control rod comprises a plurality of separately moveable control rods with each of the separately moveable control rods having a corresponding control rod position monitoring system, wherein the sonar pulses for each of the separately moveable control rod position monitoring systems has its own unique frequency.

8. The nuclear reactor system of claim 7 wherein the respective frequencies of the sonar pulses are different than any other frequencies of electromagnetic noise within the nuclear reactor system.

9. The nuclear reactor system of claim 1 wherein the control rod position monitoring system comprises redundant control rod position monitoring systems including two distinct sonar pulse generators that are independent of each other and two distinct receivers that are independent of each other.

10. The nuclear reactor system of claim 9 including two distinctly separate antennas.

11. The nuclear reactor system of claim 9 wherein the sonar pulses emitted from the two distinct sonar pulse generators are substantially emitted at the same frequency.

12. The nuclear reactor system of claim 9 wherein the sonar pulses emitted from the two distinct sonar pulse generators are emitted at separate distinct frequencies.

13. The nuclear reactor system of claim 1 wherein the antenna is a ceramic antenna.

14. The nuclear reactor system of claim 1 wherein power required to energize the sonar pulse generator and the receiver is supplied by a thermoelectric generator with a hot junction attached to the control rod drive rod housing and a cool junction located opposite the hot junction, away from the control rod drive rod housing.

15. The nuclear reactor system of claim 1 including a data transmitter that receives an original sonar pulse from the series of sonar pulses and a corresponding one of the reflected sonar signals, including amplitude and phase and sends the original sonar pulse and reflected sonar signal to a signal processing base station for computation.

16. The nuclear reactor system of claim 15 wherein the data transmitter is a wireless data transmitter.

17. The nuclear reactor system of claim 15 including a temperature sensor for monitoring a temperature within the control rod drive rod housing and operable to communicate that temperature to the data transmitter which is operable to transmit the temperature to the signal processing base station.

18. The nuclear reactor system of claim 17 wherein the temperature sensor includes a plurality of temperature sensors spaced along the control rod drive rod travel housing.

19. The nuclear reactor system of claim 17 wherein the signal processing base station is configured to determine the time of flight of the original sonar pulse and the reflected sonar signal and compensate the determination with the temperature.

* * * * *